July 27, 1965
F. R. CROWFOOT
3,197,159
CABLE CONTROL SYSTEMS
Filed June 19, 1964
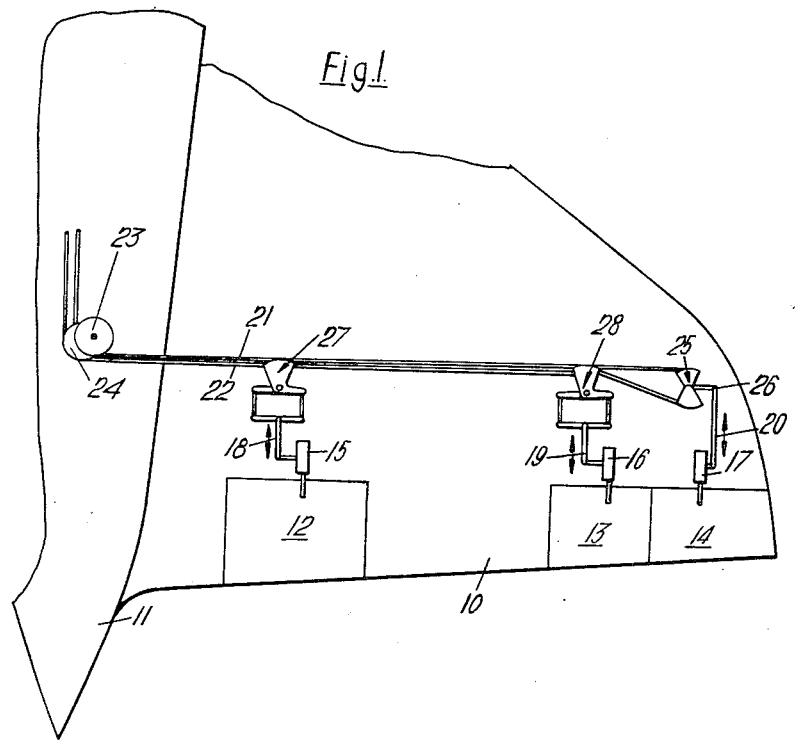
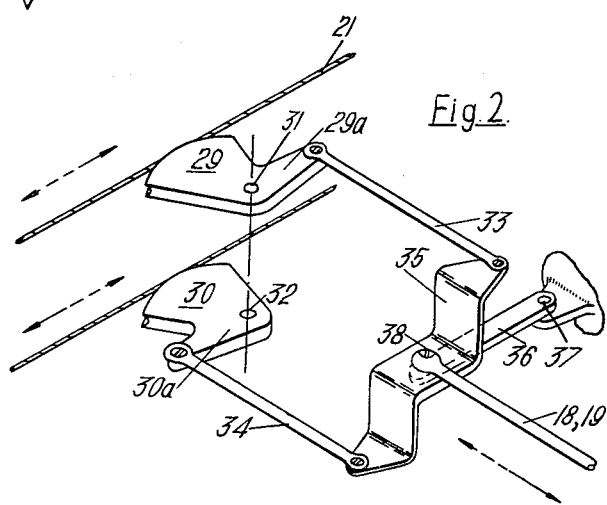
Inventor
FRANCIS RONALD CROWFOOT
By Bailey, Stephens
Huettig
Attorney

United States Patent Office 3,197,159
Patented July 27, 1965

3,197,159
CABLE CONTROL SYSTEMS
Francis Ronald Crowfoot, Downend, Bristol, England, assignor to British Aircraft Corporation (Operating) Limited, London, England, a British company
Filed June 19, 1964, Ser. No. 376,353
Claims priority, application Great Britain, June 20, 1963, 24,605/63
5 Claims. (Cl. 244—83)

This invention is particularly although not exclusively concerned with means for controlling the control surfaces on an aircraft, by means of cables. The main disadvantage of the use of cables is the short life of a cable due to large changes in tension in the cable, which result partly from differences in the expansion and the contraction of the cable and of the aircraft frame as a result of changes in temperature, and partly from structural distortions in the aircraft frame during turbulence. This disadvantage has already been largely overcome by the use of specially designed cable tension regulators.

However, it may be aerodynamically desirable to have several control surfaces mounted at intervals along the span of a wing, particularly on a large aircraft of delta plan form for example. These control surfaces may be controlled by the same two cables by means of output levers connected to the cables at intervals along their length. The problem then arises, however, that if the wing is distorted structurally because of turbulence, or expands or contracts due to changes in temperature, each separate output lever may be out of phase with the other output levers, and with an input to the cables. The invention is concerned with overcoming this difficulty.

It will be understood that the invention is not restricted to use in aircraft control systems but is also applicable to other cable control systems which may be similarly subjected to variation in temperature and/or to distortion. For example, such a system may be used to control a plurality of oven doors.

According to the invention a control system comprises two cables running alongside one another from an input unit to a series of output units spaced along the length of the cable, the input unit including a pivoted member arranged to impart opposite movements to the cables, and at least one of the output units including an output member pivoted to a mid-point of a compensating beam, the ends of which are linked to the cables via at least one rocking lever in such a way that equal movements of the cables in the same direction cause the beam to turn about its pivot, thus leaving the output member stationary, whereas equal movements of the cables in opposite directions cause the whole beam to move bodily and thereby move the output member.

Preferably the compensating beam extends nearly parallel to the cables, and each end of the compensating beam is connected to its respective cable by a link and a bell crank, the two bell cranks being of opposite hand. However, other arrangements are possible; for example the beam may be transverse to the cables, with one end connected directly to one cable, and the other end connected to the other cable via a rocking lever.

A preferred arrangement of a control system will now be described with reference to the accompanying drawings, of which:

FIGURE 1 is a diagrammatic representation of a wing and part of the fuselage of a delta-winged aircraft;

FIGURE 2 is a detailed view of part of the control system for the control surfaces on the wing shown in FIGURE 1.

FIGURE 1 shows a wing 10 and part of the fuselage 11 of a delta-winged aircraft. Flying control surfaces 12, 13 and 14 are pivotally attached to the wing and are actuated by means of jacks 15, 16 and 17. Push-pull rods 18, 19 and 20 operate selector levers on each jack and are in turn controlled by movement of the pilot's control column (not shown), via cables 21 and 22. These cables run through a duct in the fuselage 11, around pulleys 23 and 24, and spanwise through the wing to a pivotally mounted cable tensioning device 25. A lever 26 attached to the cable tensioning device 25 is connected to the push-pull rod 20 and thus actuates the control surface 14. A tensioning device such as shown at 25 is produced by Teleflex Products Limited, for example.

Additional output units for the mid-span control surfaces 12 and 13 are provided at 27 and 28. To ensure that the movements of all the control surfaces always remain in phase with each other and with the input movements, a linkage, indicated diagrammatically in FIGURE 2, is incorporated in each of the output units 27 and 28. Bell crank quadrants 29 and 30 are connected to the cables 21 and 22 and are pivoted on a common pivot axis at 31 and 32 respectively. The bell cranks are of opposite hand and have arms 29a, 30a connected respectively by links 33 and 34, to a compensating beam 35, shown in FIGURE 2 as supported by a swinging link 36 pivoted to the wing structure at 37; the presence of this link 36 gives stability to the linkage. Each push-pull rod 18 and 19 constitutes an output member and is pivotally connected to the respective compensating beam at 38 and operates selector levers on each jack 15 and 16.

In operation, movement of the pilot's control column rotates an input control quadrant (not shown), so that the cables 21 and 22 are moved in opposite directions. (This input unit including the control column and the input control quadrant is in accordance with usual practice.) The quadrants of the tension adjusting device 25 are thus rotated in the same direction, so that the lever 26 moves the push-pull rod 20, and causes the jack 17 to actuate the control surface 14. The intermediate output units 27 and 28 are also actuated as follows, with reference to FIGURE 2. The bell crank quadrants 29 and 30 are rotated about their common pivotal axis in opposite directions, so that the links 33 and 34 are both moved longitudinally in the same direction. The compensating beam 35 is thus also moved bodily by the links 33 and 34, and the movement of its mid-point connection to the push-pull rod 18 or 19 causes this push-pull rod to move the jack 15 or 16, and so to operate the control surface 12 or 13.

These intermediate output units 27 and 28 also provide automatic compensation for any differential expansion or contraction between the cables 21 and 22 and the aircraft structure. For example, the distance between the centre of the pulleys 23, 24 and the output units 25, 27 and 28 may increase by different individual increments. The resulting movement of the cables 21 and 22 will cause the quadrants of the tension adjusting device to rotate in opposite directions, and in consequence the lever 26 will remain stationary. At the same time, the movement of the cables will cause the bell crank quadrants 29 and 30 of the output units 27 and 28 to be rotated in the same direction, by the same amount. Since the links 33 and 34 are on opposite sides of the common pivotal axis of the quadrants, the compensating beam 35 will be rotated about its mid-point pivot 38, so that the idler link 36 will remain stationary, and no movement will be communicated to the push-pull rods 18 or 19. Thus, there will be no movement communicated to the jack 15, 16 or 17, and the control surfaces 12, 13 and 14 will remain stationary.

I claim:
1. A control system comprising two cables running alongside one another from an input unit to a series of output units spaced along the length of the cable, the input unit including a pivoted member arranged to impart opposite movements to the cables, and at least one of the output units including an output member pivoted to a mid-point of a compensating beam, the ends of which are linked to the cables via at least one rocking lever in such a way that equal movements of the cables in the same direction cause the beam to turn about its pivot, thus leaving the output member stationary, whereas equal movements of the cables in opposite directions cause the whole beam to move bodily and thereby move the output member.

2. A system according to claim 1, in which the compensating beam extends nearly parallel to the cables, and each end of the compensating beam is connected to its respective cable by a link and a bell crank, the two bell cranks being of opposite hand.

3. A system according to claim 2 in which the pivot of the compensating beam is connected to a fixed point by a swinging link which is nearly parallel to the cables.

4. An aircraft having a pilot's control and a plurality of control surfaces, and a system according to claim 1 serving to interconnect the pilot's control and the control surfaces.

5. An aircraft according to claim 4, in which there are at least two control surfaces in each wing, each control surface having an associated output unit, the output units further from the input unit include a cable tensioning device, and the remainder of the output units are as defined in claim 1.

No references cited.

FERGUS S. MIDDLETON, *Primary Examiner.*